(12) United States Patent
Fang et al.

(10) Patent No.: US 10,165,538 B1
(45) Date of Patent: Dec. 25, 2018

(54) USE OF DCN-ID AS BASIS FOR SERVICE CONFIGURATION AND DIFFERENTIATION

(71) Applicant: Sprint Spectrum L.P., Overland Park, KS (US)

(72) Inventors: Zheng Fang, Mclean, VA (US); Yu Wang, Fairfax, VA (US); Zheng Cai, Fairfax, VA (US); David Z. Sun, Broadlands, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/994,648

(22) Filed: May 31, 2018

(51) Int. Cl.
*H04W 4/00* (2018.01)
*H04W 60/00* (2009.01)
*H04W 76/16* (2018.01)
*H04W 8/18* (2009.01)
*H04W 88/06* (2009.01)

(52) U.S. Cl.
CPC ........... *H04W 60/005* (2013.01); *H04W 8/18* (2013.01); *H04W 76/16* (2018.02); *H04W 88/06* (2013.01)

(58) Field of Classification Search
None
See application file for complete search history.

(56) References Cited

U.S. PATENT DOCUMENTS

2017/0071023 A1   3/2017 Kunz et al.
2018/0049270 A1*  2/2018 Kubota ................. H04W 76/28

OTHER PUBLICATIONS

"Dedicated Core Networks on MME," MME Administration Guide, StarOS Release 21.4, printed from the World Wide Web on May 23, 2018.
O. Yilmaz and O. Teyeb, "LTE-NR tight-interworking and the first steps to 5G," Ericsson Research Blog, printed from the World Wide Web on May 17, 2018.
M. Kibria, et al., "Next Generation New Radio Small Cell Enhancement: Architectural Options, Functionality and Performance Aspects," arXiv:1802. 10267v1, Feb. 28, 2018.
"eDECOR—Getting closer to Network Slicing," eDECOR—Getting closer to Network Slicing / Linkedin, Jan. 29, 2017.

* cited by examiner

*Primary Examiner* — Suhail Khan

(57) ABSTRACT

Disclosed is a method and system for use of DCN-ID data as a basis for service configuration and differentiation. A UE may be provisioned with a DCN-ID that correlates with a service plan to which the UE subscribes, and the UE may include the DCN-ID in an attach request that the UE sends to a NB. The NB may then map the included DCN-ID to a service configuration for the UE and take action to configure service for the UE accordingly. In an example implementation, the service configuration could include a quantity of secondary NBs to be added for concurrent service of the UE, a set of one or more DCNs in which the UE should be connected, and a set of one or more application-layer services to be provided for the UE.

15 Claims, 7 Drawing Sheets

| DCN-ID | SET OF DCN(S) | QUANTITY OF SeNBs | SET OF APPL-LAYER SERVICE(S) |
|---|---|---|---|
| DCN-ID1 | DCN SET A | QUANTITY A | SERVICE SET A |
| DCN-ID2 | DCN SET B | QUANTITY B | SERVICE SET B |
| DCN-ID3 | DCN SET C | QUANTITY C | SERVICE SET C |
| ... | ... | ... | ... |
| DCN-IDn | DCN SET n | QUANTITY n | SERVICE SET n |

Fig. 3
MAPPING DATA

USE OF DCN-ID AS BASIS FOR SERVICE CONFIGURATION AND DIFFERENTIATION

BACKGROUND

A cellular wireless network typically includes a number of base stations or other access nodes, referred to without limitation as Node-Bs (NBs), that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each NB could be coupled with a core network that provides connectivity with various application servers and/or transport networks, such as the public switched telephone network (PSTN) and/or the Internet for instance. With this arrangement, a UE within coverage of the cellular network could engage in air interface communication with a NB and could thereby communicate via the NB with various application servers and other entities.

Such a network could operate in accordance with a particular air interface protocol (or radio access technology), with communications from the NBs to UEs defining a downlink or forward link and communications from the UEs to the NBs defining an uplink or reverse link.

In accordance with the air interface protocol, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the base stations and UEs.

Over the years, the industry has embraced various "generations" of air interface protocols, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

As the industry advances from one generation of wireless air interface technology to the next, issues arise with the need for UEs to support potentially multiple air interface protocols at once. With the transition from 4G to 5G, for instance, it is expected that UEs will be configured to support use of both technologies concurrently, with an arrangement referred to as EUTRA-NR Dual Connectivity (EN-DC). With such an arrangement, a UE might include a 4G radio and a 5G radio, with the 4G radio being served by a 4G base station concurrently with the 5G radio being served by a 5G base station. This arrangement could help support transition from 4G technology to 5G technology and may provide other benefits as well. More generally, dual connectivity could encompass service on two or more air interface protocols concurrently, to facilitate technology transitions or for other purposes.

OVERVIEW

When a wireless service provider operates a cellular wireless network or otherwise provides wireless communication service, the service provider may offer various different service plans to subscribers or other users. These service plans may differ from each other in various ways, catering to varying user needs and other circumstances.

For UEs that are configured to support dual connectivity, for instance, the service provider may offer service plans that differ from each other in terms of the extent to which the plans make use of dual-connectivity service. For instance, the service provider may offer some plans that provide just a baseline level of service using single connectivity, and the service provider may offer other plans that provide higher levels of service using some degree of dual connectivity.

Considering EN-DC for example, a service provider may offer a baseline service plan that uses just a single 4G connection and higher level service plans that use 4G and 5G connections concurrently. A representative 4G connection may support data communication at up to about 240 megabits per second (Mbps), and a 5G air interface connection may support data communication at up to about 400 Mbps. Therefore, a baseline service plan providing 4G connectivity may theoretically support up to about 240 Mbps, and a higher level service plan providing a 4G connection concurrently with a 5G connection may theoretically support up to about 640 Mbps. Further, higher level service plans that provide a 4G connection concurrently with multiple 5G connections may theoretically support data communications at gigabit per second (Gbps) speeds.

Further, a service provider could differentiate service plans in other ways as well. For instance, the service provider could offer service plans that provide UEs with access to select application-layer services, such as music or video streaming, gaming, database or file-storage, messaging, or other real-time or non-real-time communication or networking services and entitlements, among other possibilities. Providing a UE with access to certain application-layer services may involve establishing a connection between the UE and a specific dedicated core network (DCN) that provides access to such services, and perhaps setting up or otherwise facilitating use of the services, such as pushing content automatically to the UE for instance. Other forms of service differentiation may be possible as well.

In practice, a service provider may enter into subscription agreements or other arrangements that specify or otherwise establish for each of various UEs a respective service plan according to which the service provider will serve the UE. And the service provider may establish a subscription record for each UE, indicating the UE's service plan in association with a UE identifier and possibly other data. When a UE then enters into coverage of the service provider's network and discovers coverage of a NB, the UE may establish an air interface connection with that NB and engage in an attachment process to register for service with the network. And the service provider may serve the UE according to the UE's service plan as indicated in the UE's subscription record.

A problem that can arise in this process, however, is that the NB with which the UE initially connects may not have convenient, quick access, if any, to information about the UE's subscribed service plan and may therefore be unable to readily set up service for the UE in accordance with that plan.

In a representative the attachment process, the NB may learn the UE's capabilities. For instance, the NB may receive from the UE a report of the UE's capabilities, or the NB may receive UE capabilities data from a DCN control node. But merely learning the UE's capabilities does not establish that the UE subscribes to a service plan that may make use of those capabilities. For example, merely learning that a UE is capable of engaging in EN-DC service (e.g., that the UE is configured with separate 4G and 5G radios) does not establish that the UE subscribes to a service plan that provides for EN-DC service and perhaps enhanced EN-DC service that uses multiple 5G connections as opposed to a baseline 4G service plan. Further, merely learning a UE's capabilities may not establish that the UE subscribes to a service plan that entitles the UE to particular application-layer services, such as those noted above for instance. Consequently, merely learning a UE's capabilities may not enable the NB to set up services for the UE in accordance with the UE's service plan.

Further, during the attachment process, the NB may learn what type of bearer connection(s) should be established for the UE. For instance, through signaling with a DCN control node, the NB may receive a quality of service class identifier (QCI) respectively for each of one or more bearer connections to be established for the UE. But such a QCI may not indicate the subscriber's service plan and therefore may not inform the NB of the extent to which the UE should receive dual-connectivity service, particular application-layer services, and the like. Moreover, the NB may not receive the QCI until relatively late in the attachment process. Therefore, even if the QCI provided some suggestion of the UE's service plan, there would be a delay in the NB receiving that information and thus a delay in the NB being able to set up services for the UE in accordance with the UE's service plan.

Disclosed herein is an improvement that may help to overcome these technological hurdles. The disclosure leverages a DCN identity (DCN-ID) parameter that may be stored in a UE and that the UE may transmit to an initially selected NB during attachment or at another time. The UE's service provider may arrange for the DCN-ID to be a value that correlates specifically with the UE's service plan, so that, upon receipt of that value, the NB can readily take action to set up and/or facilitate service of the UE in accordance with the UE's service plan.

In practice, the service provider may offer numerous different service plans (such as but not limited to those noted above, or combinations of such plans), and the service provider could associate a different DCN-ID respectively with each such service plan and could provision each UE with the DCN-ID associated with UE's service plan. For instance, during a first attachment process and/or periodically thereafter, the service provider could transmit to the UE the DCN-ID that corresponds with the UE's service plan, and the UE could store that DCN-ID and could then provide it to a serving NB the next time the UE seeks to attach or engages in other control-signaling.

Each NB in the service provider's network could further be provided with access to mapping data (or to a mapping server, such as an advanced intelligent network (AIN) node) that correlates various DCN-IDs with respective service configuration details appropriate for the associated service plans. Thus, based on a DCN-ID that a NB receives from the UE during attachment or at another time, the NB could (by itself, and/or through interoperation with one or more other entities) determine the service configuration details associated with the UE's service plan. And the NB could then readily take action to configure or trigger configuration of appropriate service for the UE.

In a representative implementation, a UE's service plan may provide for the UE to receive a particular extent of dual-connectivity service, such as to be served by a particular quantity of additional NBs (e.g., 5G NBs) concurrently with a primary or master serving NB (e.g., a 4G NB). Further, the UE's service plan may provide for the UE to be connected with one or more particular DCNs, perhaps to facilitate providing the UE with one or more particular application-layer services accessible in or via such DCNs. And, possibly separate from any DCN identification or selection, the UE's service plan may provide for making one or more particular application-layer services available to the UE and/or providing the UE with such service.

Thus, when a NB receives a UE's DCN-ID, the NB could map that parameter to various combinations of such service configuration details, and the NB could accordingly take and/or trigger associated action.

Accordingly, in one respect, disclosed is a method for configuring service of a UE in a wireless communication system having a plurality of NBs including a first NB and one or more second NBs, the plurality of NBs being communicatively linked with a plurality of DCNs.

In an example implementation, the method includes the first NB receiving from the UE an attach request carrying a DCN-ID that the UE received during earlier attachment with the wireless communication system. Further, the method includes the first NB extracting the DCN-ID from the attach request and mapping the extracted DCN-ID to (i) one or more DCNs, of the plurality of DCNs, with which the UE is to be connected and (ii) a quantity of the second NBs by which the UE is to be served concurrently with the first NB serving the UE. And the method includes, responsive to the attach request (e.g., responsive to the extracted DCN-ID), the first NB configuring service for the UE in accordance with the mapping.

In another example implementation, the method includes provisioning each UE with a respective DCN-ID corresponding with a service plan established for the UE, where a first UE's respective DCN-ID differs from a second UE's respective DCN-ID and corresponds with a different service plan than the second UE's respective DCN-ID. Further, the method includes, upon receipt by the first NB, from any one of the UEs, of a signaling message carrying the UE's respective DCN-ID, (A) the first NB reading the UE's respective DCN-ID from the signaling message, (B) the first NB mapping the extracted DCN-ID to a service configuration including (i) one or more of the DCNs to connect the UE with and (ii) a quantity of the second NBs to serve the UE concurrently with the first NB serving the UE, and (C) the first NB configuring service of the UE in accordance with the mapping. In practice, this method could result in the first UE's respective DCN-ID mapping to a different service configuration than the second UE's respective DCN-ID, and thus a different service configuration being established for the first UE than for the second UE.

In another respect, disclosed is a method for configuring service of UEs in a wireless communication system having a plurality of collocated NBs including a first NB and one or more second NBs, the plurality of NBs being communicatively linked with a plurality of DCNs, at least one of the DCNs being locally situated at a cell site of the NBs. The method includes the first NB receiving, from the UE, an attach request carrying a DCN-ID that the UE received earlier from the wireless communication system. Further, the method includes the first NB extracting, from the attach request, the DCN-ID. And the method includes, responsive to the extracted DCN-ID, carrying out a service configuration process for the UE including (i) configuring the first NB and one or more of the second NBs to concurrently serve the UE, (ii) establishing a split bearer connection between the UE and the local DCN via the first NB and via the one or more second NBs, (iii) pushing media content to the UE via the split bearer connection, using concurrent transmissions to the UE from the first NB and the one or more second NBs, and (iv) then discontinuing service of the UE by the one or more second NBs, such as by releasing the connection respectively between each of the one or more second NBs and the UE.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 3 is a depiction of example mapping data that could be used in accordance with the disclosure.

DETAILED DESCRIPTION

An example implementation will now be described in the context of a network that includes both 4G LTE and 5G NR base stations that have communication paths with multiple DCNs, and where representative UEs are capable of engaging in EN-DC service (e.g., each having a 4G radio and a 5G radio and being capable of engaging in communication concurrently via those radios) but where each UE's service plan may or may not entitle the UE to engage in EN-DC service and/or or more other services. It should be understood, however, that the principles disclosed herein could extend to apply with respect to other scenarios as well, such as with respect to other air interface protocols and services. Further, it should be understood that other variations from the specific arrangements and processes described are possible. For instance, various described entities, connections, functions, and other elements could be added, omitted, distributed, re-located, re-ordered, combined, or changed in other ways.

Figure 1:
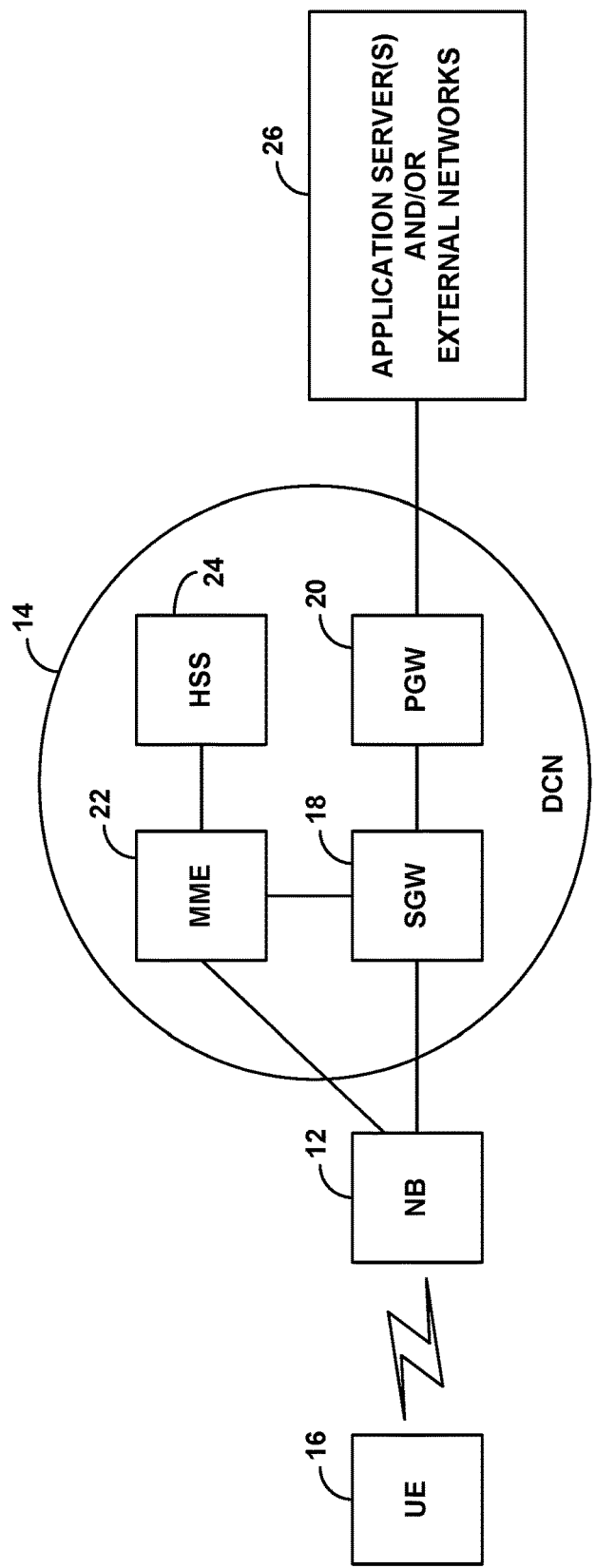
FIG. 1 is a simplified block diagram of an example network arrangement in which aspects of the present disclosure can be implemented.

FIG. 1 is a simplified block diagram of an example network arrangement, showing a single representative NB 12, a single representative DCN 14, and a single representative UE 16.

In this example, the NB 12 provides a wireless coverage area 18 that operates according to a representative air interface protocol such as 4G LTE or 5G NR. As such, the NB 12 may be configured to provide service on one or more carriers, such as one or more TDD carriers each spanning a respective range of frequency, and the NB 12 may be configured to aggregate the bandwidth of multiple carriers in order to serve UEs with high-speed data communication on multiple carriers at once.

The representative NB 12 may take the form of a macro NB of the type typically configured with an antenna tower or the like to provide a broad range of coverage, or a small cell, femtocell, or the like, typically having a smaller form factor and providing a more narrow range of coverage, among other possibilities. The NB 12 includes an antenna structure for engaging in air interface communication with UEs, a backhaul interface for communicating with one or more DCNs such as DCN 14 and perhaps with other NBs, and a radio for generating downlink signals for transmission by the antenna structure and for decoding received uplink transmissions. The NB 12, or a combination of NBs, could constitute or be part of a radio access network (RAN), serving to provide connectivity between UEs and DCNs.

The representative DCN 14 may comprise a private packet-switched network configured to support UE service via one or more NBs such as NB 12, to facilitate UE access to services and/or other networks. As shown, the representative DCN 14 includes a serving gateway (SGW) 18, a packet-data-network gateway (PGW) 20, a mobility management entity (MME) 22, and a home subscriber server (HSS) 24. These network entities may sit as nodes on the DCN 14, each having a respective Internet Protocol (IP) address on the DCN 14, to facilitate packet-based communication between the entities, via defined tunnels or other interfaces. The NB 12 may also sit as a node on the DCN 14 or may be communicatively linked with the DCN 14 in another manner (e.g., through one or more intervening nodes or channels).

In this arrangement, the MME 22 operates as an example control node for the DCN 14 and may be part of a group or pool of MMES operable control the DCN 14. And the HSS 24 may operate to store UE profile data and the like. The SGW 18 and PGW 20 then operate as a gateway system of the DCN 14, with the SGW 18 interfacing with the NB 12 and with the PGW 20, and with the PGW 20 operable to provide connectivity with one or more application servers and/or external networks 26 (e.g., with one or more application servers being accessible within the DCN 14 or via one or more external networks with which the DCN 14 provides connectivity) and to assign IP addresses to UEs to facilitate their communication on and via the DCN 14.

When UE 16 enters into coverage of NB 12, the UE 16 may engage in random-access signaling and connection-signaling with the NB 12, to establish a radio-link-layer connection, such as a logical Radio Resource Control (RRC) connection, with the NB 12, and the NB 12 may configure the connection to encompass possibly multiple carriers (also referred to as multiple "cells" defining a "cell group") to facilitate high-speed data communication as noted above. Further, the UE may initiate an attachment process (if not a handover process) to register with the network, by transmitting to the NB 12 an attach request, and the NB 12 may then select MME 22 and forward to MME 22 the UE's attach request to facilitate authentication and attachment processing.

In response to the UE's attach request, the MME 22 may then work to authenticate the UE and to set up for the UE 16 a default bearer connection (bearer) defining a logical tunnel between the UE 16 and the PGW 20 to facilitate communication between the UE 16 and one or more application servers and/or via external networks 26. For instance, the MME 22 could engage in signaling with the NB 12 and the SGW 18 to set up for the UE an S1 tunnel between the NB 12 and the SGW 18, and the SGW 18 could responsively engage in signaling with the PGW 24 to set up for the UE an S5 (or S8) tunnel between the SGW 22 and PGW 24, with the S1 and S5 tunnels cooperatively defining an access bearer for carrying packet data communications to and from the UE via the NB 12.

In addition, upon attachment and/or at other times, the UE may also request, or the MME may initiate, setup of one or more additional bearers for the UE. For instance, bearers could be set up to facilitate UE signaling and data communication with one or more application servers or the like, possibly depending on the UE's service profile or in response to initiation of certain communications. For example, one such application server may be an Internet Multimedia Subsystem (IMS) platform that supports voice over IP (VoIP) service and other packet-based real-time media services, in which case the MME may set up for the UE a signaling bearer through which the UE could engage in Session Initiation Protocol (SIP) signaling or the like with the IMS to set up and manage VoIP calls or other sessions. And when a VoIP call or other IMS session is being set up for the UE, the MME may set up for the UE a dedicated bearer (e.g., having a guaranteed bit rate) for carrying session media content to and from the UE.

Once the UE is so connected and attached, the NB 12 may serve the UE with packet-data communications. When the PGW 24 receives packet-data destined to the UE (e.g., from an application server and/or external network), that data would flow via a UE bearer to the NB 12. The NB 12 may then select downlink air interface resources, such as physical resource blocks spanning particular time and frequency segments, to carry the data to the UE, and may engage in scheduling communication with the UE to specify the resources and transmit the data to the UE on the scheduled resources. Likewise, when the UE has data to transmit (e.g., to an application server and/or external network), the UE may send a scheduling request to the NB 12, the NB 12 may select uplink air interface resources to carry the data from the UE and may engage in scheduling communication with the UE to specify the resources, the UE may transmit the data to the NB on the scheduled resources, and the NB may forward the data via a UE bearer to the PGW 24 for output to its destination.

Figure 2:
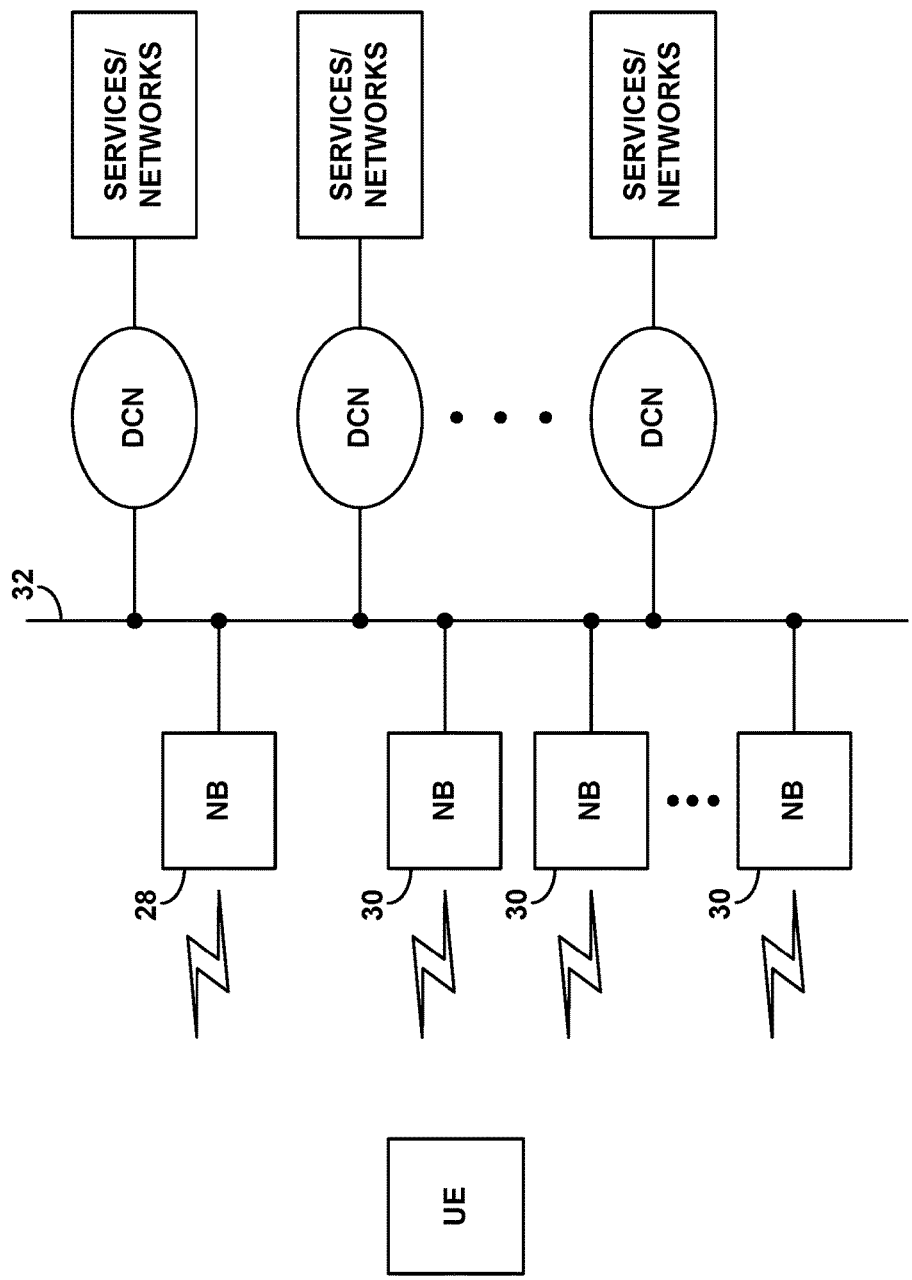
FIG. 2 is another simplified block diagram of an example network arrangement in which aspects of the present disclosure can be implemented.

FIG. 2 is next a simplified block diagram of an example network arrangement including multiple NBs that are communicatively linked with multiple DCNs. As shown, the NBs include a first NB 28 that may function as a master NB (MeNB) for dual-connectivity purposes and multiple NBs 30 that may function as secondary NBs (SeNBs) for dual-connectivity purposes. In a representative implementation, the MeNB 28 may be a 4G LTE NB (eNB), and the SeNBs 30 may each be 5G NBs (gNBs).

Each of these NBs may be configured to serve UEs over a respective air interface connections when appropriate. For instance, each NB could when appropriate engage in connection-signaling with a UE to establish an RRC connection between the NB and the UE, with the RRC connection possibly encompassing multiple carriers (a cell group, as noted above) to support high-speed data service for the UE. And through inter-NB signaling and control by the MeNB for instance, multiple such NBs could concurrently serve a given UE, with each NB establishing a respective RRC connection with the UE, so as to provide the UE with dual-connectivity service.

Further, some or all of the illustrated NBs might be collocated, by being situated at common cell site (e.g., with a common cell tower and/or other common cell site equipment, possibly providing largely coterminous coverage, subject to differences in path loss and other variations). Alternatively, some or all of the NBs might be located at separate cell sites. In either case, there could be communication interfaces between the NBs, such as X2 interfaces for carrying signaling and/or bearer traffic between the NBs.

Each DCN could then take the form discussed above for instance, including one or more MMEs, SGWs, PGWs, and HSSs, for instance. And each DCN may include and/or provide connectivity with one or more application servers and/or external networks, some of which may be specific to particular DCNs and others of which might be accessible through multiple DCNs. Further, the various DCNs may be situated or distributed at different locations. For instance, one or more DCNs may be situated locally at a cell site where one or more of the NBs are located, such as by providing the DCN's MME, SGW, PGW, HSS, and possibly associated application servers or the like as nodes or services collocated with a baseband unit or other equipment of one or more such NBs. And one or more other DCNs may be situated more remotely from the NBs, such as being centrally located in a region of the wireless service provider's network to facilitate various NBs in the region providing connectivity with the DCN(s).

In FIG. 2, the various NBs are shown being communicatively linked with each other and with the various DCNs via a network 32. Network 32 could be a primary core network of the wireless service provider, and each DCN could be defined as a virtual local area network (VLAN) or the like on the primary core network. Alternatively, other types of communication links and network arrangements could be provided.

With the illustrated arrangement, a UE may be configured to discover and connect by default with a 4G NB, and when appropriate the 4G NB may work to set up dual-connectivity for the UE, adding one or more 5G connections. For instance, the UE may initially engage in random-access signaling and connection-signaling with MeNB 28 to establish an RRC connection between the UE and MeNB 28, and MeNB 28 may then coordinate addition of one or more 5G connections for the UE. To facilitate this, MeNB 28 could provide the UE with a list of 5G carriers on which the UE should scan for coverage, the UE may scan for coverage on each such 5G carrier, the UE may report to MeNB 28 any sufficiently strong 5G coverage detected by the UE, and MeNB 28 may then direct the UE to connect with the SeNB(s) 30 providing the reported coverage. The UE may then engage in random-access signaling and connection-signaling with each SeNB 30 to establish an RRC connection between the UE and the SeNB 30. And the MeNB 28 may further engage in signaling with each such SeNB 30 to associate each such added RRC connection with the UE served by the MeNB.

In addition, the UE may transmit an attach request to the MeNB 28, and the MeNB 28 may forward the attach request to the MME of a DCN to facilitate authentication and attachment of the UE, including setup of one or more bearers for the UE through the DCN as discussed above. And to facilitate concurrent service of the UE by the MeNB 28 and each of one or more SeNBs 30, the MeNB could engage in further signaling to split each such bearer for the UE so as to allow bearer communication via both the MeNB 28 and each added SeNB 30. For instance, the MeNB could add to the attach request that the MeNB sends to the MME an identification of each added SeNB (e.g., the SeNB's network address and a terminal endpoint identifier), and the MME could responsively engage in signaling with each SeNB and with the SGW, to split each of the UE's bearers at the SGW into separate S1 interfaces for each SeNB. Alternatively, the splitting could be done within the MeNB or an SeNB, through appropriate setup signaling.

With such a dual-connectivity and split-bearer configuration, the MeNB and each SeNB could concurrently serve the UE. For downlink communication, each NB serving the UE could receive and transmit to the UE a separate respective portion of the data destined to the UE, with the transmissions optimally occurring concurrently so as to facilitate cumulatively high speed transmission. And for uplink communication, the UE could transmit a portion of the data respectively to each NB serving the UE, likewise with the transmissions optimally occurring concurrently so as to facilitate cumulatively high speed transmission.

Further, the MeNB may when appropriate work to set up concurrent connectivity for the UE with multiple DCNs. For instance, when the MeNB receives the UE's attach request, the MeNB may forward the UE's attach request to multiple DCNs (to a selected MME respectively of each of multiple DCNs), so as to facilitate bearer setup for the UE in each of the multiple DCNs, possibly separate types of bearers per DCN if appropriate. And provided with dual connectivity involving the MeNB and one or more SeNBs, split bearers could be set up respectively with each such DCN.

In an example implementation, as noted above, the wireless service provider may provision each of various UEs with a DCN-ID that corresponds with the UE's service plan, the UE may include that DCN-ID within its attach request, and the NB receiving that attach request may use the DCN-ID as a basis to determine a service configuration for the UE and may accordingly configure service for the UE.

The service provider can provision a UE with the appropriate DCN-ID during the UE's first attachment and/or possibly periodically or in other circumstances. For instance, when the UE's attach request passes to an MME, the MME may query an HSS to determine what DCN-ID should be provided to the UE. For such a UE, per the UE's service profile, the HSS could provide the MME with a UE usage-type value that corresponds with the UE's service plan. And the MME could map that UE usage-type value to a DCN-ID (e.g., DCN-ID value), which the MME could then pass to the UE in an attach response message or the like. The UE could then store the DCN-ID for later use.

Thereafter, when the UE next sends an attach request to a NB such as MeNB 28, the UE could include within the attach request the DCN-ID, or the NB could otherwise receive the UE's DCN-ID And the NB could then map that DCN-ID to the corresponding service configuration associated with the UE's service plan. To facilitate this, the wireless service provider could configure the NB with mapping data that correlates each of various DCN-IDs with respective service configurations, possibly set forth in markup language or coded in another manner for instance. Or each NB could be provided with access to communicate with a mapping server or the like that has such mapping data and could receive NB queries and return results.

FIG. 3 is a simplified representation of a mapping table, illustrating how various DCN-IDs could correspond with respective service configurations associated with particular service plans. Although this illustration shows a single table with several entries, it should be understood that representative mapping data in accordance with the present disclosure could be more complex, including many more DCN-ID correlations and multiple interrelated tables of data.

The simplified example of FIG. 3 shows DCN-IDs as values 1, 2, 3, . . . n. Each of these DCN-ID values could comprise a bit string of sufficient length to facilitate differentiation of a desired number of service plans and associated service configurations. The example then shows each DCN-ID being mapped respectively to (i) a set of one or more particular DCNs, designated as sets A, B, C, . . . n, for illustration, (ii) a quantity of SeNBs, designated as quantities A, B, and C, . . . n, for illustration, and (iii) a set of one or more application-layer services, designated as sets A, B, and C, . . . n, for illustration.

The mapping data could specify the set of one or more DCNs by specifying for each DCN an associated MME or MME-group identifier (perhaps one or more MME network addresses), so that a NB provided with the mapping can select or otherwise determine an MME to which the NB should signal to facilitate setup of UE bearer connectivity in each indicated DCN, and the NB could proceed accordingly.

The mapping data could specify the quantity of SeNBs as an integer value that is zero or more, with a value of zero meaning that no SeNBs should be added (thus corresponding to single-connectivity, e.g., just 4G service), and with a value of one or more indicating how many SeNBs should be added. Further, if one or more SeNBs are indicated, the mapping data could further specify other attributes of the SeNBs to be added. Provided with this mapping, a NB could thus determine whether and if so to what extent to add dual-connectivity service (e.g., EN-DC service) for a UE, and the NB could proceed accordingly.

Further, the mapping data could specify each of the one or more application-layer services by specifying one or more attributes and/or instructions for providing or otherwise making available the application-layer service. For instance, the mapping data could specify a DCN that provides access to a given application-layer service, so that a NB could determine to connect the UE with that DCN to facilitate providing the UE with the application-layer service. And the mapping data could include or otherwise indicate an instruction for the NB to itself provide and/or to engage in signaling with one or more service nodes or the like to facilitate providing of the application-layer service to the UE. Thus, provided with this mapping, a NB could identify and determine how to facilitate providing one or more particular application-layer services to a UE, and the NB could proceed accordingly.

Note that variations on this mapping data and mapping functionality are possible. For instance, there could be fewer, more, or different service-configuration correlations, including correlations with other classes of service configurations and/or other specific service configurations, per DCN-ID, and combinations or subsets of noted configurations could be specified. Other examples are possible as well.

In this manner, when a NB receives the UE's attach request (or other UE signaling message, such as a tracking area update for instance) carrying the UE's DCN-ID, the NB could map the DCN-ID to a service configuration that corresponds with the UE's service plan. Thus, the NB could readily ascertain an appropriate service configuration for the UE and could work to configure service for the UE accordingly.

Through this process, the UE's DCN-ID could facilitate service differentiation, with UEs' different service plans corresponding with different DCN-IDs, and with different DCN-IDs corresponding with different service configurations. In practice, a NB could use the UE's provided DCN-ID as a basis to determine whether and, if so, to what extent, to invoke dual connectivity service for the UE. Further, the NB could use the UE's provided DCN-ID as a basis to facilitate and/or trigger providing or controlling one or more application-layer services for the UE. And the NB could use the UE's provided DCN-ID as a basis to determine which one or more DCNs to connect the UE with.

By way of example, a UE's DCN-ID may map to providing the UE with just 4G service and bearer connectivity in a single DCN (e.g., for basic Internet connectivity). Thus, even if the UE is EN-DC capable, the NB that receives the UE's attach request carrying that DCN-ID may forgo invoking of EN-DC service for the UE and may interact with just a single DCN to facilitate bearer connectivity for the UE.

As another example, a UE's DCN-ID may map to providing the UE with EN-DC service and specifically to an extent of such service such as a particular quantity of 5G NBs to add for the UE. The NB that receives the UE's attach request carrying that DCN-ID may thus add the specified extent of EN-DC service for the UE.

As still another example, a UE's DCN-ID may map to multiple DCNs, such as to a local or nearby DCN to facilitate certain services (such as delivery of latency-sensitive content, including possibly real-time media service and gaming service) as well as a remote DCN to facilitate other services (such as basic Internet connectivity and access to application services via the Internet). Thus, the NB that receives the UE's attach request carrying that DCN-ID may signal to an MME of each of multiple specified or otherwise appropriate DCNs to trigger bearer establishment for the UE in each such DCN.

Yet further, as another example, a UE's DCN-ID may map to one or more particular application-layer services (such as IMS, VoIP, gaming, video streaming, file storage, messaging, and/or others), and the mapping data may correlate each of various application-layer services with one or more respective DCNs that provide connectivity with application-layer servers or platforms that provide, manage, control, or otherwise facilitate the application-layer service. As a result, when the NB receives the UE's attach request carrying that DCN-ID, the mapping data could map the DCN-ID to the one or more application-layer services and in turn to one or more associated DCNs, and the NB could responsively signal to an MME of each such DCN to trigger bearer establishment for the UE in each such DCN.

As another example, a UE's DCN-ID may map to a particular type of entitlement for the UE, such as to particular content that the UE is to receive from one or more particular application-layer servers and/or from the NB itself. When the NB receives the UE's attach request carrying that DCN-ID, the NB may then responsively engage in signaling with the corresponding application-layer servers or may engage in internal processing, to trigger delivery of the indicated entitlement to the UE, such as to trigger pushing of media content data to the UE and/or pushing to the UE of network address information and/or security data that may enable the UE to obtain the entitlement.

Further, as another example, a UE's DCN-ID may map to certain access control parameters, such as to access control rules that govern whether the UE will be allowed to access particular content, services, or the like. These access control rules could facilitate parental control or other restricted access to particular content. When the NB receives the UE's attach request carrying that DCN-ID, the NB may then responsively store a record of the associated access control rules and/or signal to one or more other entities to trigger imposition of the associated access control rules, so that the rules will be applied to the UE's communications.

Figure 4:
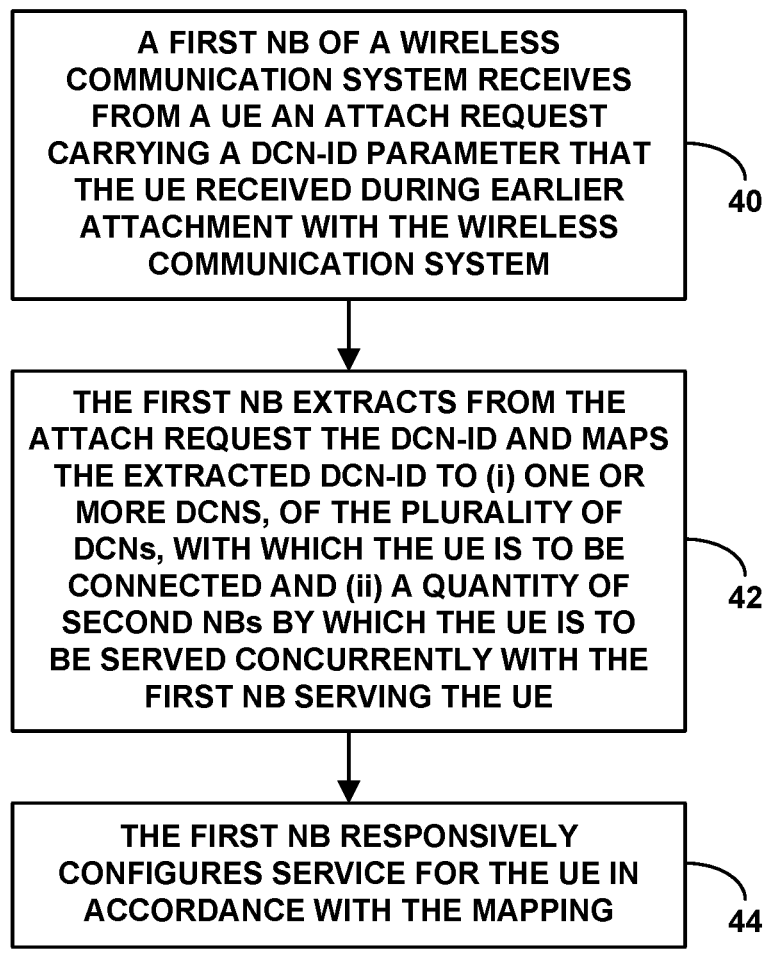
FIG. 4 is a flow chart depicting an example method in accordance with the disclosure.

FIG. 4 is a flow chart depicting an example method for configuring service of a UE in a wireless communication system having a plurality of NBs including a first NB and one or more second NBs, where the plurality of NBs are communicatively linked with a plurality of DCNs. As shown in FIG. 4, at block 40, the method includes the first NB receiving from the UE an attach request carrying a DCN-ID parameter that the UE received during earlier attachment with the wireless communication system. At block 42, the method then includes the first NB extracting from the attach request the DCN-ID and mapping the extracted DCN-ID to (i) one or more DCNs, of the plurality of DCNs, with which the UE is to be connected and (ii) a quantity of the second NBs by which the UE is to be served concurrently with the first NB serving the UE. And at block 44, the method includes, responsive to the attach request (e.g., to the extracted DCN-ID), the first NB configuring service for the UE in accordance with the mapping.

In line with the discussion above, the plurality of NBs in this example method could be collocated, and the first NB might operate according to one air interface protocol (e.g., 4G) and each second NB might operate according to another air interface protocol (e.g., 5G). Further, the first NB could have access to mapping data that correlates each of various DCN-IDs with a respective service configuration, and the act of the first NB mapping the extracted DCN-ID to the one or more DCNs with which the UE is to be connected and to the quantity of the second NBs by which the UE is to be served concurrently with the first NB serving the UE could involve the first NB querying the mapping data based on the extracted DCN-ID.

Also in line with the discussion above, the act of the first NB configuring service for the UE in accordance with the mapping could involve the first NB establishing for the UE a service configuration that include (i) connection of the UE with the one or more DCNs, (ii) service of the UE by the quantity of the second NBs concurrently with service of the UE by the first NB.

In practice, for instance, the one or more DCNs could be multiple DCNs (including perhaps a local DCN and a remote DCN), in which case the act of establishing for the UE the service configuration including connection of the UE with the multiple DCNs could involve, for each DCN of the multiple DCNs, engaging by the first NB in signaling with the DCN (e.g., with an MME of the DCN) to trigger establishment of one or more bearer connections between the UE and a gateway of the DCN.

Further, the quantity of second NBs by which the UE is to be served concurrently with the first NB serving the UE could be one or more second NBs, and the act of establishing for the UE the service configuration including service of the UE by the quantity of the second NBs concurrently with service of the UE by the first NB could involve for each second NB of the quantity of second NBs, (i) the first NB engaging in signaling to trigger service by the second NB of the UE, and (ii) the first NB engaging in signaling to establish for the UE at least one split bearer connection between the UE and each DCN of the one or more DCNs, the at least one split bearer connection extending to or via both the first NB and the second NB.

In addition, per the discussion above, the method could also involve the first NB mapping the extracted DCN-ID to one or more application-layer services to be provided for the UE, and the first NB configuring service for the UE in accordance with the mapping could involve the first NB establishing for the UE a service configuration that includes (i) connection of the UE with the one or more DCNs, (ii) service of the UE by the quantity of the second NBs concurrently with service of the UE by the first NB, and (iii) providing for the UE of the one or more application-layer services.

In practice, for instance, a given one of the one or more application-layer services might correspond with a given one of the one or more DCNs, and the first NB configuring service for the UE in accordance with the mapping could involve the first NB triggering connection of the UE with the given DCN to facilitate the providing for the UE of the given application-layer service. For example, the application-layer service could comprise IMS service. Further, the application-layer service could comprise a media service (such as a gaming service and/or transmission of media content for playout by the UE) and the DCN could be a local DCN situated at a cell site of the first NB to facilitate low-latency delivery of the media service for the UE.

Figure 5:
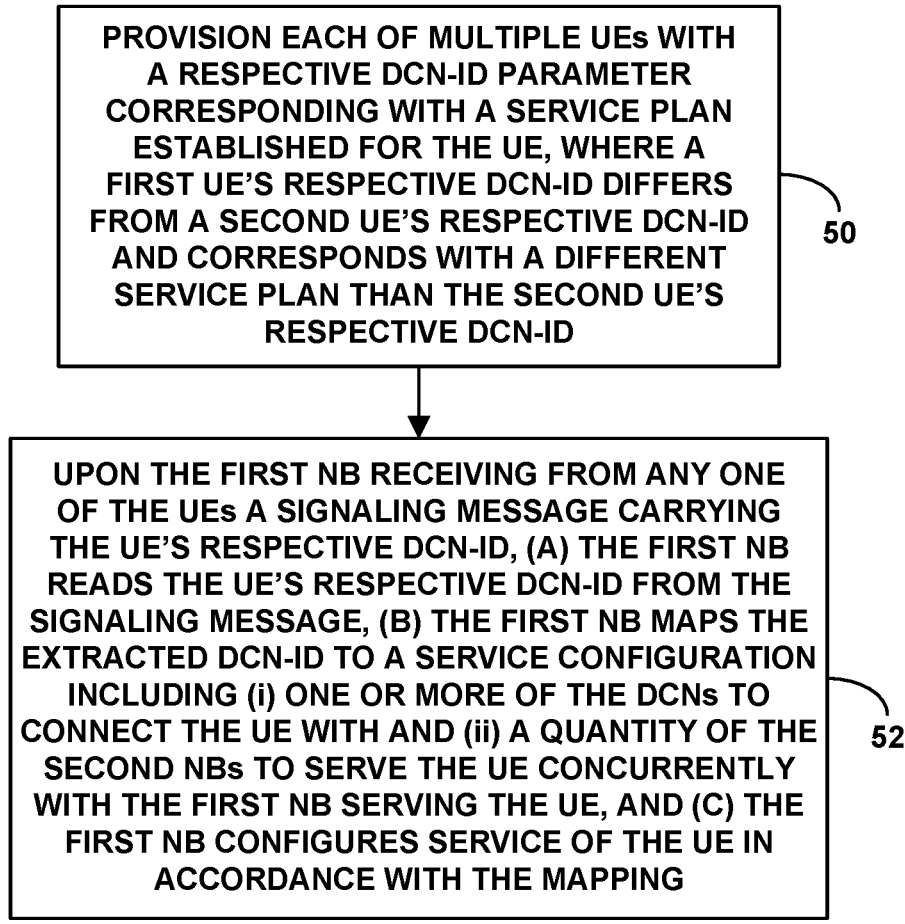
FIG. 5 is another flow chart depicting an example method in accordance with the disclosure.

FIG. 5 is another flow chart depicting a method for configuring service of UEs in a wireless communication system having a plurality of NBs including a first NB and one or more second NBs, where the plurality of NBs are communicatively linked with a plurality of DCNs. As shown in FIG. 5, at block 50, the method involves provisioning each UE with a respective DCN-ID parameter corresponding with a service plan established for the UE, where a first UE's respective DCN-ID differs from a second UE's respective DCN-ID and corresponds with a different service plan than the second UE's respective DCN-ID. At block 52, the method includes, upon the first NB receiving from any one of the UEs a signaling message carrying the UE's respective DCN-ID, (A) the first NB reading the UE's respective DCN-ID from the signaling message, (B) the first NB mapping the extracted DCN-ID to a service configuration including (i) one or more of the DCNs to connect the UE with and (ii) a quantity of the second NBs to serve the UE concurrently with the first NB serving the UE, and (C) the first NB configuring service of the UE in accordance with the mapping.

In an example implementation of this method, the one or more DCNs includes multiple DCNs, including a local DCN situated at a cell site of the first NB and a remote DCN situated separate from the cell site of the first NB, and the quantity of the second NBs is at least one. Further, various features of this method could be combined with features discussed above, and vice versa.

Figure 6:
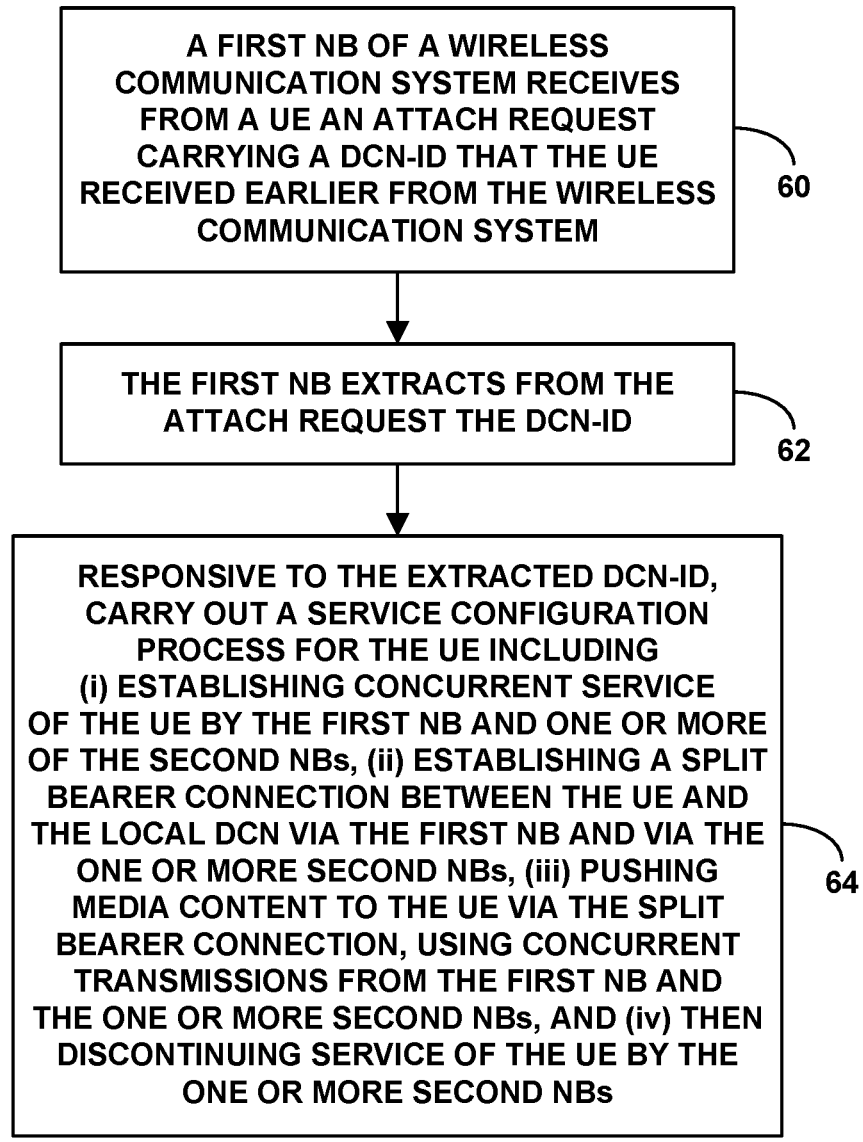
FIG. 6 is another flow chart depicting an example method in accordance with the disclosure.

FIG. 6 is next a flow chart depicting a specific example method for configuring service of UEs in a wireless communication system having a plurality of collocated NBs including a first NB and one or more second NBs, where the plurality of NBs are communicatively linked with a plurality of DCNs, at least one of the DCNs being locally situated at a cell site of the NBs. As shown in FIG. 6, at block 60, the first NB receives from the UE an attach request carrying a DCN-ID that the UE received earlier from the wireless communication system. At block 62, the method includes the first NB extracting (e.g., reading) from the attach request the DCN-ID. And at block 64, the method includes, responsive to the extracted DCN-ID, carrying out a service configuration process for the UE including (i) establishing concurrent service of the UE by the first NB and one or more of the second NBs, (ii) establishing a split bearer connection between the UE and the local DCN via the first NB and via the one or more second NBs, (iii) pushing media content to the UE via the split bearer connection, using concurrent transmissions from the first NB and the one or more second NBs, and (iv) then discontinuing service of the UE by the one or more second NBs.

In an example implementation of this method, the act of pushing the media content to the UE via the split bearer connection could involve retrieving the media content from data storage accessible in the local DCN and transmitting the retrieved media content to the UE via the local DCN, the first NB, and the one or more second NBs. Further, the media content could comprise movie content and/or other content.

Figure 7:
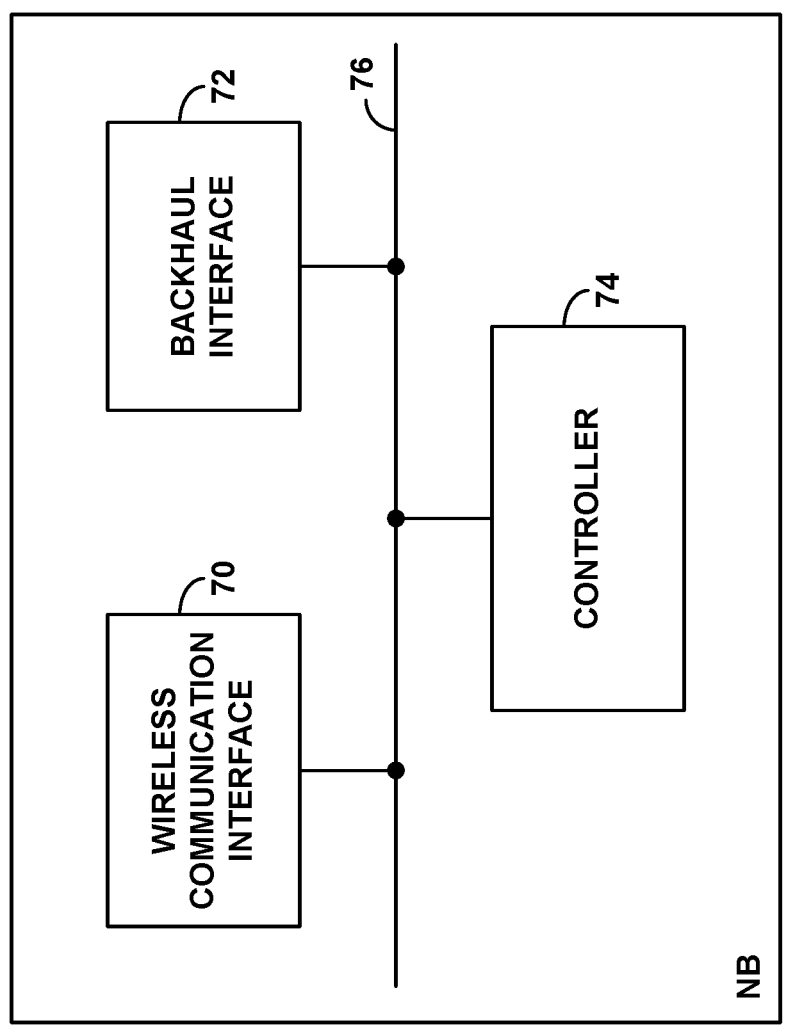
FIG. 7 is a simplified block diagram of a NB operable in accordance with the disclosure.

FIG. 7 is next a simplified block diagram of an example NB that could be operable in accordance with the present disclosure. As shown, the example NB includes a wireless communication interface 70, a backhaul interface 72, and a controller 74, all of which may be communicatively linked together by a system bus, network, or other connection mechanism 76.

In this arrangement, the wireless communication interface 70 may be configured to provide cellular coverage and to engage in air interface communication with served UEs. As such, wireless communication interface 70 may comprise an antenna structure, which may be tower mounted or may take other forms, and associated components such as a power amplifier and a wireless transceiver, so as to facilitate providing a coverage area defining an air interface having a downlink and an uplink, and engaging in transmission and reception of bearer and control data over the air interface in accordance with an air interface protocol such as any of those noted above. Further, backhaul interface 72 may comprise a wired or wireless interface, such as an Ethernet network communication interface, configured to support communication with other entities, such as with MMES, SGWs, and other NBs for instance.

Controller 74 may then comprise control logic to cause the NB to carry out particular operations including those discussed above. As such, the controller 74 may take various forms, including but not limited to a processing unit including one or more processors (e.g., general purpose microprocessors and/or dedicated processing units) and data storage (e.g., one or more volatile and/or non-volatile storage components, such as magnetic, optical, or flash storage) holding program instructions executable by the processing unit to cause the base station to carry out various operations described herein. It should also be understood that the present disclosure contemplates a non-transitory computer readable medium having encoded thereon program instructions executable to carry out such operations.

Exemplary embodiments have been described above. Those skilled in the art will understand, however, that changes and modifications may be made to these embodiments without departing from the true scope and spirit of the invention.

We claim:

1. A method for configuring service of a user equipment device (UE) in a wireless communication system having a plurality of Node-Bs (NBs) including a first NB and one or more second NBs, wherein the plurality of NBs are communicatively linked with a plurality of dedicated core networks (DCNs), the method comprising:

receiving by the first NB, from the UE, an attach request carrying a DCN identity (DCN-ID) that the UE received during earlier attachment with the wireless communication system;

extracting by the first NB, from the attach request, the DCN-ID, and mapping by the first NB the extracted DCN-ID to (i) one or more DCNs, of the plurality of DCNs, with which the UE is to be connected and (ii) a quantity of the second NBs by which the UE is to be served concurrently with the first NB serving the UE; and responsive to the attach request, configuring by the first NB, for the UE, service in accordance with the mapping.

2. The method of claim 1, wherein the plurality of NBs are collocated.

3. The method of claim 1, wherein the first NB has access to mapping data that correlates each of various DCN-IDs with a respective service configuration, and wherein mapping by the first NB the extracted DCN-ID to (i) the one or more DCNs, of the plurality of DCNs, with which the UE is to be connected and (ii) the quantity of the second NBs by which the UE is to be served concurrently with the first NB serving the UE involves querying by the first NB the mapping data based on the extracted DCN-ID.

4. The method of claim 1, wherein configuring by the first NB, for the UE, service in accordance with the mapping comprises establishing by the first NB, for the UE, a service configuration including (i) connection of the UE with the one or more DCNs, (ii) service of the UE by the quantity of the second NBs concurrently with service of the UE by the first NB.

5. The method of claim 4, wherein the one or more DCNs is multiple DCNs, and wherein establishing for the UE the service configuration including connection of the UE with the multiple DCNs comprises:

for each DCN of the multiple DCNs, engaging by the first NB in signaling with the DCN to trigger establishment of one or more bearer connections between the UE and a gateway of the DCN.

6. The method of claim 5, wherein the plurality of NBs are collocated in a common cell site, and wherein the multiple DCNs includes a local DCN at the cell site and a remote DCN separate from the cell site.

7. The method of claim 5, wherein engaging in signaling by the first NB respectively with each DCN comprises engage in signaling by the first NB with a mobility management entity (MME) of the DCN.

8. The method of claim 4, wherein the quantity of the second NBs by which the UE is to be served concurrently with the first NB serving the UE is one or more second NBs, and wherein establishing for the UE the service configuration including service of the UE by the quantity of the second NBs concurrently with service of the UE by the first NB comprises:

for each second NB of the quantity of second NBs, engaging in signaling by the first NB to trigger service by the second NB of the UE, and engaging in signaling by the first NB to establish for the UE at least one split bearer connection between the UE and each DCN of the one or more DCNs, the at least one split bearer connection extending to or via both the first NB and the second NB.

9. The method of claim 1, further comprising mapping by the first NB the extracted DCN-ID to one or more application-layer services to be provided for the UE, wherein configuring by the first NB, for the UE, service in accordance with the mapping comprises establishing by the first NB, for the UE a service configuration including (i) connection of the UE with the one or more DCNs, (ii) service of the UE by the quantity of the second NBs concurrently with service of the UE by the first NB, and (iii) providing for the UE of the one or more application-layer services.

10. The method of claim 9, wherein a given one of the one or more application-layer services corresponds with a given one of the one or more DCNs, wherein configuring by the first NB, for the UE, service in accordance with the mapping comprises triggering by the first NB connection of the UE with the given DCN to facilitate the providing for the UE of the given application-layer service.

11. The method of claim 10, wherein the given application-layer service comprises Internet Protocol Multimedia Subsystem (IMS) service.

12. The method of claim 9, wherein the given application-layer service comprises a media service, and wherein the given DCN is a local DCN situated at a cell site of the first NB to facilitate low-latency delivery of the media service for the UE.

13. The method of claim 12, wherein the media service comprises a gaming service.

14. The method of claim 12, wherein the media service comprises transmission of media content to the UE for playout by the UE.

15. The method of claim 1, wherein the first NB operates according to a first air interface protocol, and wherein each second NB operates according to a second air interface protocol different than the first air interface protocol.

* * * * *